US007481541B2

(12) United States Patent
Maximus et al.

(10) Patent No.: US 7,481,541 B2
(45) Date of Patent: Jan. 27, 2009

(54) METHOD AND SYSTEMS FOR PROJECTING IMAGES

(75) Inventors: Bart Maximus, Oudenaarde (BE);
Wauter Bulcke, Harelbeke (BE);
Robert Mark Clodfelter, Dayton, OH (US)

(73) Assignee: Barco N.V.

( * ) Notice: Subject to any disclaimer, the term of this patent is extended or adjusted under 35 U.S.C. 154(b) by 135 days.

(21) Appl. No.: 11/111,711

(22) Filed: Apr. 22, 2005

(65) Prior Publication Data
US 2006/0238717 A1 Oct. 26, 2006

(51) Int. Cl.
*G03B 21/14* (2006.01)
(52) U.S. Cl. .................. 353/85; 353/121; 348/742; 348/798
(58) Field of Classification Search .......... 353/84, 353/33, 31, 28, 85, 121; 348/742, 743, 771, 348/800–802, 798; 359/887–892
See application file for complete search history.

(56) References Cited

U.S. PATENT DOCUMENTS 5,912,651 A    6/1999  Bitzakidis et al.

| | | | |
|---|---|---|---|
| 6,392,620 B1 * | 5/2002 | Mizutani et al. | 345/88 |
| 6,879,451 B1 * | 4/2005 | Hewlett et al. | 359/891 |
| 2002/0093477 A1 * | 7/2002 | Wood | 345/89 |
| 2003/0123120 A1 * | 7/2003 | Hewlett et al. | 359/237 |
| 2003/0218688 A1 * | 11/2003 | Shaw et al. | 348/370 |
| 2003/0227465 A1 * | 12/2003 | Morgan et al. | 345/589 |

FOREIGN PATENT DOCUMENTS

| WO | WO 94/09473 | 4/1994 |
|---|---|---|
| WO | WO 02/080136 | 10/2002 |

\* cited by examiner

*Primary Examiner*—Andrew T Sever
(74) *Attorney, Agent, or Firm*—Bacon & Thomas, PLLC

(57) ABSTRACT

A projection system for projecting images is described. The projection system has an illumination system for generating an illumination beam comprising sequential color portions. The illumination beam is guided to a light modulating means based on light valves, which allows modulating an impinging illumination beam such that it comprises image information about an image to be displayed. The images are refreshed after an image frame time $t_{frame}$. The illumination of the light modulating means for generating an image is substantially performed during a first time interval of the image frame time $t_{frame}$. The latter results in an improved displaying of fast moving images.

11 Claims, 6 Drawing Sheets

US 7,481,541 B2

METHOD AND SYSTEMS FOR PROJECTING IMAGES

TECHNICAL FIELD OF THE INVENTION

The present invention relates to systems and methods for projecting images. More particularly, the present invention relates to methods and systems for projecting images using spatial light modulating devices such as light valves, e.g. liquid crystal displays, liquid crystal on silicon devices or digital light processing devices.

BACKGROUND OF THE INVENTION

In simulation applications the temporal reproduction of an image is very important. Actually, the standard is set by CRT monitors or projectors, where the image is formed on the phosphor and decays very rapidly after it was written. Because of this rapid decay, there is a very limited 'hold' effect, where the image stays at the same place for a certain time. In projectors using transmissive or reflective light valves, like an LCD, LCOS or DLP, the image is typically present for a longer time on the light modulating means resulting in a larger 'hold' effect. This causes some blurring of moving images when the eye is tracking a moving object.

Projection systems wherein image generation is based on light valves are known from prior art. A typical projection system based on a single light modulating means using light valves for generating image information typically comprises an illumination module with a lamp which generates white light, a rotating color wheel which is placed in the optical path, which color wheel consist of red, green, blue and in some cases also white filter segments and a light modulating means, e.g. an LCD, LCOS or DLP device, which is illuminated by the light which was filtered by the color wheel. As a consequence, the illumination will be a temporal sequence of red, green, blue and optionally white light, in this or in another sequence. The speed of the color wheel is synchronized to the refresh rate of the image, so that every new image goes through equivalent sequences of color filter segments on the color wheel. The modulation of the light modulating means is adapted to the sequence of colors that illuminate the device, if the color of the light is for instance red, then the information for the red image is presented to the light modulating means. This ordering of information in line with the amount, order and width of the different color intervals is called "a sequence". Such a sequence may e.g. be calculated by a tool provided by Texas Instruments, the manufacturer of DLP devices, and downloaded into the projector. Sometimes a sequence consists of a multiple times a red, green, blue and optionally white illumination interval. This means that the red, green, blue and white image information is split over more than one subframe, which helps to improve a well-known artifact called color break-up. This system can be provided by a color wheel with N times a red, green, blue and optionally white segment, or more practically by a color wheel with only once the red, green, blue and optionally white segment but rotating at N times the speed, or in other words the rotation frequency of the color wheel is in that case N times the refresh frequency of the image. In this case the term "2× color wheel" or "3× color wheel" or in general "N× color wheel" is often used. FIG. 1a shows an example of illumination timing, i.e. luminance intensity as a function of a frame time, on a light modulating means based projector with a 2× RGB color wheel. The illumination R, G and B is repeated and therefore occurring twice during the frame time of the image. FIG. 1b shows the influence of the light modulating means operation on the illumination light in one illumination interval, i.e. for a single illumination of the light modulating means with one color. The illumination on the light modulating means is denoted by the striped line 10. The light modulating means will, depending on its state, either reflect the illuminated light towards the projection lens and hence to the screen, or not reflect it towards the projection lens. As a result the light on the screen will be modulated i.e. as denoted by the full line 12.

Recently some digital light processing (DLP) projectors were demonstrated where the illumination is done by LED devices. In this case the color wheel can be omitted, and replaced by a system where the light from three types of LED devices, namely red, green and blue LEDs, is combined into one optical path and is used to illuminate the DLP device. In this case the color sequences of red, green, blue and optionally also white on the DLP device can be generated by sequentially pulsing the LEDs. For instance, for making the red illumination only the red LED is turned on, while the green and blue LED are turned off. For making white all three color LEDs can be turned on together. Just like the situation with the color wheel, also here the LED pulsing has to be synchronized to the image information on the DLP device.

It is a disadvantage of the above-described systems that the quality for displaying and projecting moving images still is not optimum, resulting in e.g. some blurring of the images.

SUMMARY OF THE INVENTION

It is an object of the present invention to provide projection and/or displaying methods and systems using spatial light modulating devices such as light valves allowing displaying or projecting moving images with high quality.

In a first aspect, the present invention provides a projection system for projecting images, the projection system comprising an illumination system and a light modulating means, said illumination system being adapted for providing illumination on said light modulating means and said images being refreshed after an image frame time $t_{frame}$, wherein during at least one time interval of said image frame time $t_{frame}$ no illumination or a substantially reduced illumination of said light modulating means is performed. With substantially reduced illumination may be meant less than 50%, more preferably less than 66%, even more preferably less than 75%, still more preferably less than 80% of the illumination intensity during the remaining part of the image frame time $t_{frame}$. Said at least one time interval may be at least 10%, at least 20%, at least 33% or at least 50% of the image frame time $t_{frame}$.

In a second aspect, the present invention provides a projection system for projecting images, the projection system comprising an illumination system and a light modulating means, said illumination system being adapted for providing illumination on said light modulating means and said images being refreshed after an image frame time $t_{frame}$, wherein said illumination of said light modulating means for generating an image is substantially performed during a first time interval of said image frame time $t_{frame}$. With "said illumination of said light modulating means is substantially performed" is meant more than 66%, even more preferably 75%, still more preferably 80% of the luminance intensity to be displayed for an image is provided. Said first time interval may be at most 66%, preferably at most 50% of said image frame time $t_{frame}$. Said light modulating means is a spatial light modulating means and may be any of a digital light processing device, a liquid crystal device or a liquid crystal on silicon device.

In a projection system according to the present invention, it may be such that no illumination of said light modulating means is provided during a second time interval of said image frame time $t_{frame}$, not overlapping with said first time interval. The second time frame may be the complement of the first time interval with respect to said image frame time $t_{frame}$.

In a projection system according to the present invention, it may be such that, during a second time interval of said image frame time $t_{frame}$ not overlapping with said first time interval, a reduced illumination of said light modulating means is provided, compared to said illumination in said first time interval. The second time frame may be the complement of the first time interval with respect to said image frame time $t_{frame}$. During said second time interval additional bit depth may be provided for said image.

When representing the image with a bit depth comprising N bits, then according to an embodiment of the present invention it may be so that during said second time interval only a predetermined number L of least significant bits is represented, while during the first interval the remaining, N-L most significant bits are represented.

The illumination obtained in the second time interval may be matched with the illumination obtained in the first time interval so as to obtain an appropriate bit depth.

In a projection system according to embodiments of the present invention, the illumination system may comprise a light source adapted for emitting light having at least two different colors, and a color selection means, e.g. a color wheel, said color selection means, e.g. color wheel comprising a first set of color segments for filtering colors from said light emitted by said light source and a second set of color segments comprising at least one segment with a substantially reduced transmittance compared to said color segments of said first set of color segments or with a zero transmittance. Said at least one segment of said second set of color segments, may be a number of color segments equal to a number of color segments of said first set of color segments and adapted to filter the same colors as the color segments of said first set of color segments. Said first set of color segments may comprise color segments for filtering the primary colors. Said first set of color segments furthermore may comprise a color segment for filtering white illumination light. For said color segment for filtering white illumination light, said second set of color segments may comprise a grey or dark grey filter segments.

In a projection system according to embodiments of the present invention, the illumination system may comprise a number of light sources, each light source being adapted for emitting a specific color, said illumination on said light modulating means being obtained by controlling the driving of said number of light sources accordingly. Said controlling the driving of said number of light sources may comprise providing a drive current to said number of light sources in the first time interval, and providing no drive current to said number of light sources in a second time interval. Said controlling the driving of said number of light sources may comprise providing a total drive current to said number of light sources in the first time interval that is higher than the total drive current to said number of light sources in the second time interval. Controlling the driving of said number of light sources may comprise providing a higher drive current to said number of light sources in the first time interval compared to the situation in which the illumination would be equal in both time intervals.

In a further aspect, the present invention provides a method for projecting images, each image being refreshed after an image frame time $t_{frame}$, the method comprising:

providing illumination of a light modulating means during a first time interval of said image frame time $t_{frame}$ providing a substantially reduced illumination of said light modulation means or no illumination of said light modulating means during a second time interval of said image frame time $t_{frame}$, said second time interval of said image frame time $t_{frame}$, not overlapping with said first time interval.

Said providing illumination may comprise sequentially providing differently colored portions of an illumination beam. Said sequentially providing differently colored portions may be obtained by selecting differently colored portions of an illumination beam using a first portion of a color selection means, e.g. a rotating color wheel. Said sequentially providing differently colored portions may alternatively be obtained by sequentially driving separate light sources, each emitting a different color.

Said providing substantially reduced illumination or no illumination may comprise substantially reducing or blocking said illumination beam. Said substantially reducing or blocking may be obtained using a second portion of a color selection means, e.g. a rotating color wheel. Alternatively, said substantially reducing or blocking may be obtained by driving separate light sources at a lower driving current, compared to said driving in said first time interval, or by not driving said separate light sources.

In yet another aspect, the present invention provides a projection system for projecting images, the projection system comprising an illumination system, the illumination system comprising a light source emitting light comprising at least two different colors, and a color selection means, e.g. a color wheel, said color selection means, e.g. color wheel, comprising a first set of color segments for filtering colors from said light provided by said light source and a second set of color segments comprising at least one segment with a substantially reduced transmittance compared to said color segments of said first set of color segments or with a zero transmittance.

In yet another aspect, the present invention provides a projection system for projecting images, the projection system comprising an illumination system, the illumination system comprising a number of light sources, each light source adapted for emitting a specific color, a driving unit and a controller for controlling a drive current provided to said light sources, wherein said controller is adapted for sequentially driving said number of light sources during a first time interval of said image frame time $t_{frame}$ at a first current level and adapted for driving said number of light sources during a second time interval of said image frame time at a second current level, substantially smaller than said first current level, or for not driving said number of light sources.

The invention also relates to a single chip DLP or LCOS projector with an illumination principle that restricts the illumination of the DLP or LCOS device with red, green, blue and optionally white light to a first interval within a frame time, and keeps the illumination of the DLP or LCOS device at a second interval in the frame time to 0. The illumination may be realized by a color selection means, e.g. color wheel, that comprises a first set of primary color filter segments and optionally a white segment, and an additional segment that is black. The light source used may be a combination of a number of colored LEDs, and where the lack of illumination in the second interval is compensated by a higher drive current in the first interval, compared to the situation in which the 2 intervals would have an equal illumination.

The invention furthermore relates to a DLP or LCOS projector with an illumination principle that has a first illumination level of the DLP or LCOS device for red, green, blue and optionally white light during a first interval within a frame time, and a second illumination level of the DLP or LCOS device for red, green, blue and optionally white light during a second interval within a frame time. During the second interval only a chosen number L of least significant bits are represented, while during the first interval the other N-L most significant bits are represented. The illumination level of the second interval scales in such a way to the illumination interval of the first interval that the resulting brightness of the least significant bits is well matched to the brightness of the most significant bits and that together a nice and smooth grey level tracking is obtained. The illumination may be realized by a color selection means, e.g. a rotating color wheel, which consists of a first set of primary color filter segments and optional white segment, and a second set of primary color segments which are substantially darker than the first set of primary color filter segments and optionally one or more dark grey filter segment. The light source may be a combination of a number of colored LEDs, and where the low illumination and hence lower drive current in the second interval is compensated by a higher drive current in the first interval, compared to the situation in which the two intervals would have an equal illumination.

It is an advantage of the embodiments of the present invention that projection and/or displaying methods and systems using spatial light modulators, such as light valves, e.g. liquid crystal devices (LCD), liquid crystal on silicon devices (LCOS) or digital light processing devices (DLP), are provided with modified optical arrangements so that they become better suited to project and/or display fast moving images with low perceived motion blur.

It is also an advantage of the embodiments of the present invention that, for projectors using sequential color methods, the "color break up" and "image break up" effects, caused by the temporal nature of the color sequencing and the repeating images of each frame, are reduced.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for displaying and/or projecting images especially fast moving images.

Other features and advantages of the present invention will become apparent from the following detailed description, taken in conjunction with the accompanying drawings, which illustrate, by way of example, the principles of the invention.

DESCRIPTION OF THE PREFERRED EMBODIMENTS

Figure 1A:
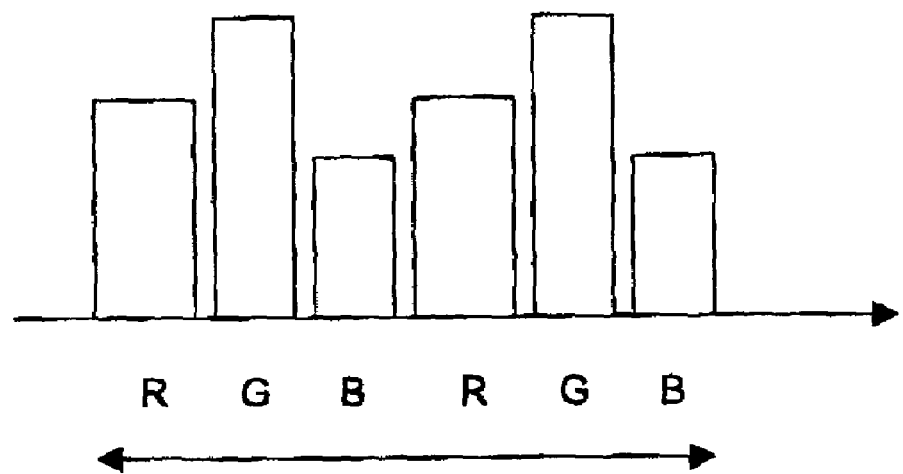
FIG. 1a is a graph indicating the illumination intensity during an image frame for a projection system using a color wheel as known from the prior art.
Figure 1B:
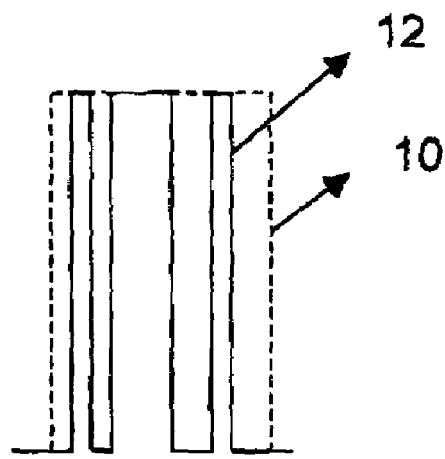
FIG. 1b is a detailed graph indicating the illumination intensity during an image frame for a projection system using a color wheel as known from the prior art, illustrating the illumination on the light modulating means and the processed illumination after influencing by the light modulating means.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In the present invention methods and systems are provided for projecting images, especially suitable for moving images. Images thereby typically are refreshed after an image frame time $t_{frame}$.

Figure 2:
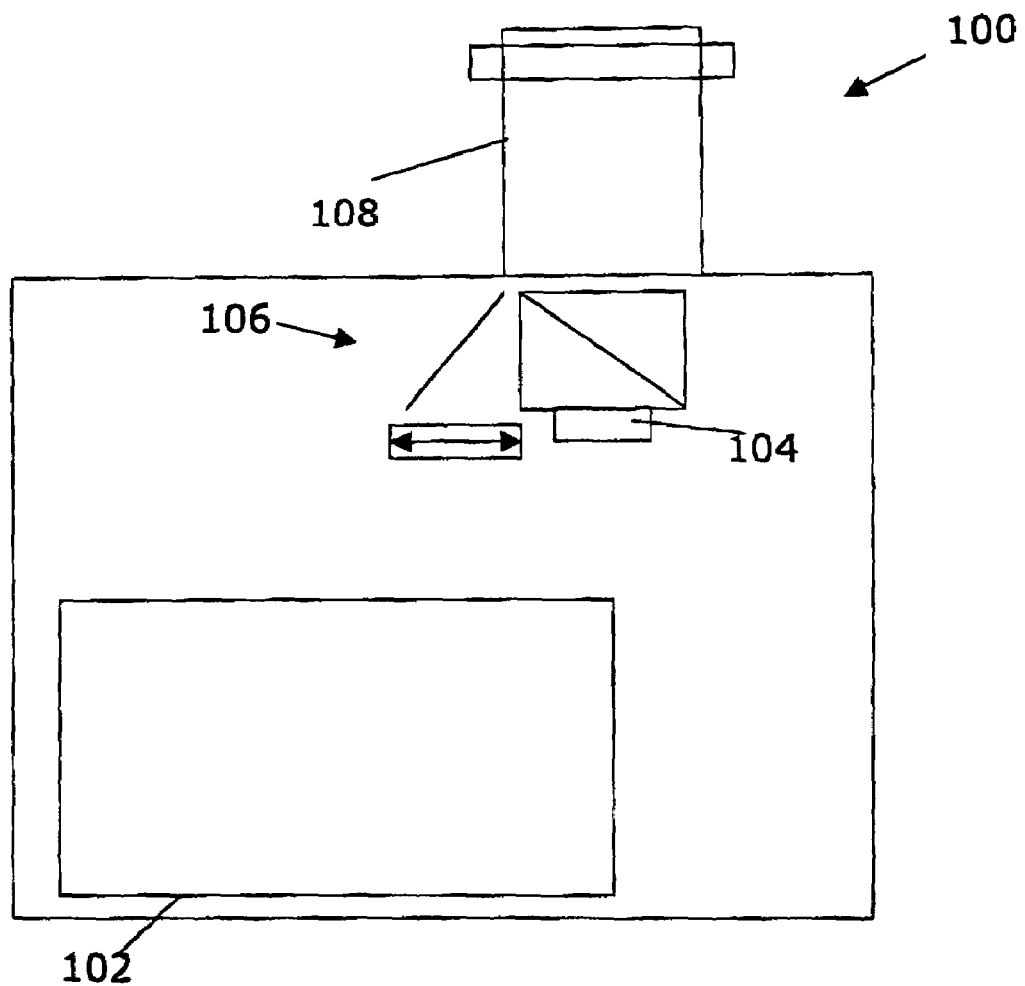
FIG. 2 is an illustration of a projection system adapted for providing high quality projection of fast moving images, according to a first embodiment of the present invention.

In a first embodiment, the present invention relates to methods and systems for projecting images with a high quality, especially projecting fast moving images with a high quality, whereby the image information is provided by a light modulating means comprising light valves. The high quality is obtained by reducing the total time needed for projecting substantially the major part of the luminance intensity to be provided on the light modulating means for generating the image in the image frame. With the major part of the luminance intensity to be provided on the light modulating means is meant more than 50%, more preferably more than 66%, even more preferably 75%, still more preferably 80% of the luminance intensity to be provided on the light modulating means for generating the image in the image frame. A schematic overview of an exemplary system 100 according to the present embodiment of the present invention is shown in FIG. 2. The system comprises an illumination system 102, adapted for providing an illumination beam comprising different color portions emitted sequentially, and a light modulating means 104 for modulating the impinging illumination beam according to image information to be displayed.

The illumination system 102 is adapted for providing an illumination beam comprising different color portions that are sequentially emitted. The different color portions may e.g. be primary colors, e.g. red, green and blue (RGB), or alternatively yellow, cyan and magenta, or any other suitable color combination. The different color portions also may comprise a white color portion. If a red, green, blue and white (RGB&W) color portion is present the system is referred to as a redundant color system. It is to be noted that although typically systems are used based on RGB or RGB&W, other colors and another number of different colors may be used. The illumination beam thus typically comprises at least a first color portion and a second color portion, emitted sequentially. In other words, the illumination beam thus is a temporal sequence of at least a first color portion and a second color portion, e.g. a temporal sequence of a red color portion, a blue color portion, a green color portion and optionally a white color portion in this or any other sequence.

The light modulating means 104 is based on light valves, which may be transmissive or reflective light valves. The light modulating means is a means for modulating an impinging illumination beam such that it comprises image information about an image to be displayed. It may e.g. be a liquid crystal display (LCD) device, a liquid crystal on silicon (LCOS) device, a digital light processing (DLP) device, such as e.g. a digital mirror device, etc. The image portions provided on the light modulating means 104 is refreshed at a refresh rate and the illumination system 102 is adapted to provide the color portions of the illumination beam synchronized with the refresh rate of the image portions, so that every new image goes through equivalent sequences of color filter segments on the color selection means, e.g. color wheel. The modulation of the light modulating means thus is adapted to the sequence of colors that illuminate the light modulating means; if the color of the light is for instance red, then the information for the red image is presented to the light modulating means. This ordering of information in line with the amount, order and width of the different color intervals is called "a sequence". This synchronization may be obtained using a controller (not shown in the drawings). It is to be noted that it is not necessary or generally desirable that the color segments have equal duration in time or size on the color selection means, e.g. color wheel.

In the present invention, the illumination system 102 furthermore is adapted for providing the illumination beam such that the major part of the illumination intensity on the light modulating means in an image frame, corresponding with the major part of the luminance intensity to be displayed for an image in an image frame, is projected in a time interval smaller than the image frame time. Preferably, the major part of the illumination intensity to be provided on the light modulating means for creating an image in an image frame is outputted in a time interval which is smaller than 90% of the complete frame time, more preferably smaller than 75% of the complete frame, even more preferably smaller than 67% of the complete frame time. With the major part of the luminance intensity is meant more than 50%, more preferably more than 66%, even more preferably 75%, still more preferably 80% of the luminance intensity to be provided on the light modulating means for generating the image in the image frame. Depending on the type of illumination system used, restricting the output of the major part of the illumination intensity for illuminating the light modulating means for creating an image in an image frame to a time interval smaller than the image frame time can be done in different ways. If the illumination system 102 is for example based on a white light source, whereby the sequential color portions are generated e.g. using a color wheel, the color wheel can be adapted such that it restricts or blocks the luminance intensity in the illumination beam during part of the image frame time. In another example, whereby the illumination system 102 is based on separate color light sources, providing light of different colors, restriction of the luminance intensity during part of the image frame time can be obtained by not driving any of the color light sources or driving them such that a substantially lower output is obtained, during part of the image frame time. These examples will be discussed more in detail in the following embodiments. Restricting the major part of the illumination intensity to part of the image time frame, furthermore may be obtained using other techniques, e.g. using a combination of controlling the driving time of separate light sources and reducing the light intensity transmitted using a blocking means. The light modulating means 104 thereby is controlled such that it provides the corresponding color image portions when the corresponding different color portions of the illumination beam are provided.

The projection system furthermore may comprise additional components, such as e.g. an optical system 106 for guiding the illumination beam from the illumination system 102 to the light guiding means 104 and a projection lens 108, and/or optional components, not needed for understanding the present invention and well known by the person skilled in the art. Such an optical system 106 may e.g. comprise lenses, beam splitters and/or mirrors. It is an advantage of the present invention that it allows projecting fast moving images without or with a reduced blurring effect and that the image break-up effects are reduced. The latter thus is obtained by reducing the total time that the image or at least the major part thereof is displayed.

Figure 3:
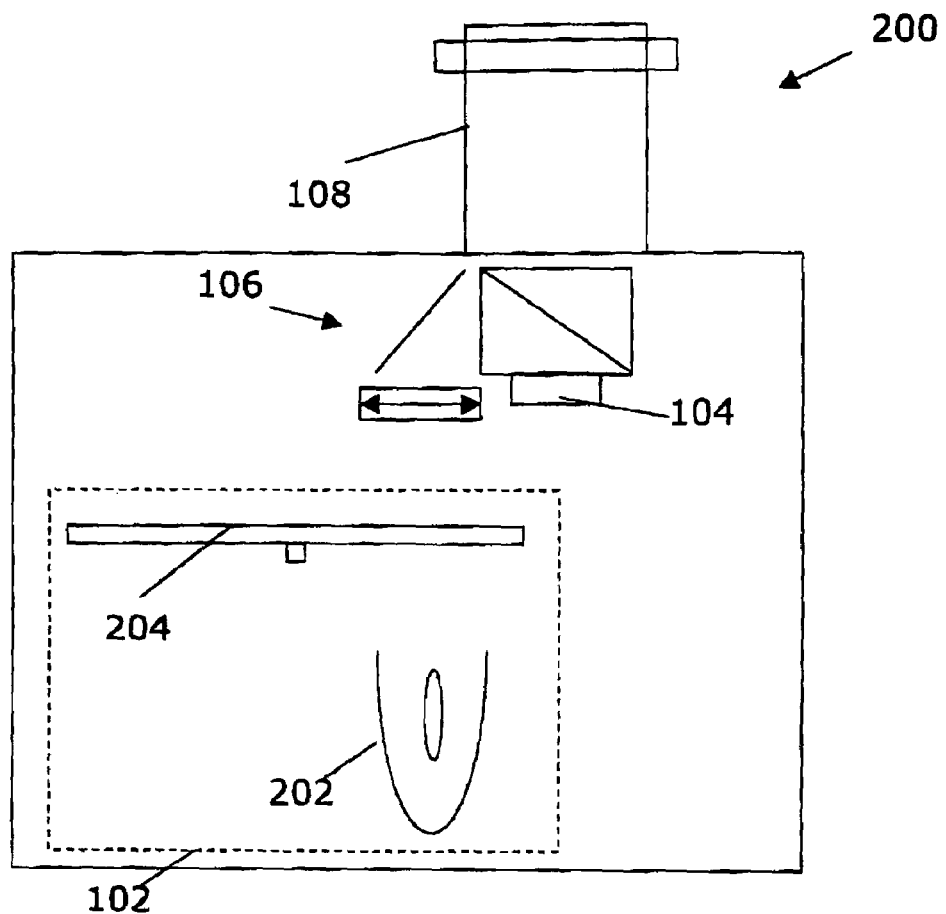
FIG. 3 is a diagrammatic illustration of a projection system adapted for reducing blurring effects in moving images according to a second embodiment of the present invention.

In a second embodiment, the present invention relates to a system for projecting images at high quality according to the system of the first embodiment, wherein the illumination system 102 comprises a light source emitting different colors and a color wheel for sequentially splitting color portions in the illumination beam. The system allows reducing blurring and image break-up effects in a projection system based on light valves. The latter is obtained by adapting the system such that the major part of the illumination intensity needed for displaying an image in an image frame is restricted to a time period smaller than the image time frame. The system of the present embodiment, as shown in FIG. 3, is a projection system 200 comprising an illumination system 102 with a light source 202 adapted for emitting an illumination beam comprising light of different wavelengths and a rotatable color wheel 204 placed in the optical path for filtering the illumination beam from the light source 202 such that it comprises sequentially portions of a specific color. The projection system furthermore comprises, as described in the first embodiment, a light modulating means 104 based on light valves for generating image related information. Other components and characteristics present in the first embodiment of the present invention may also be present in the present embodiment.

The color wheel 204 typically comprises a first set of color segments adapted for filtering specific colors from the light beam generated by the light source. The color wheel thus comprises a first set of color segments comprising at least a first color segment and a second color segment for filtering a first color and a second color from the light beam emitted by the light source 202. The first color thereby differs from the second color. Typically, although the invention is not limited thereto, the first set of color segments is adapted for filtering the primary colors, i.e. red, green and blue light. Alternatively, the first set of color segments may be adapted for filtering yellow, magenta and cyan light. Furthermore, the first set of color segments may be adapted for operating in a redundant system, i.e. whereby besides color segments for filtering primary colors also a color segment for filtering white light is present. In the present embodiment, the color wheel 204 is furthermore adapted in such a way that the total time in which the major part of the illumination intensity for creating/projecting an image of an image frame is output is reduced. The latter may be performed by introducing a second set of color segments comprising at least one segment, which is darkened, or in other words which has a substantially low transmittance for all colors. In other words, the color wheel 204 comprises, besides the first set of segments, at least one segment wherein the transmittance is substantially smaller than in each of the segments of the first set. With substantially smaller it is meant that the transmittance is at least 50% smaller, preferably at least 66% smaller or at least 75% smaller or at least 90% smaller or at least 99% smaller than the transmittance of each of the segments of the first set, for all wavelengths, or that the transmittance is zero. By way of example, different alternatives are discussed.

Figure 4:
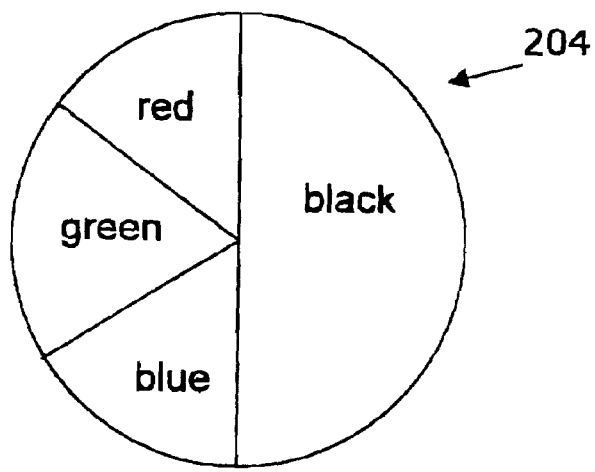
FIG. 4 is an exemplary illustration of a color wheel for use in a projection system according to a first alternative of the second embodiment of the present invention.
Figure 5:
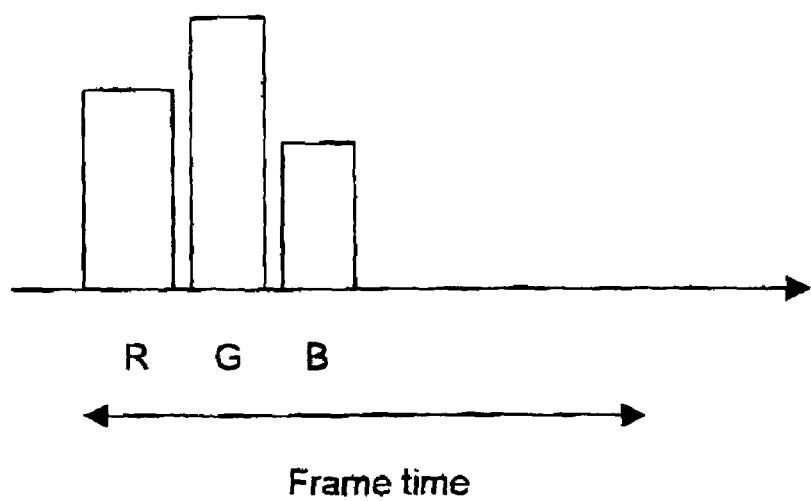
FIG. 5 is a graph indicating the illumination intensity during a frame for a projection system using a color wheel as shown in FIG. 4.

In a first alternative, the second set of color segments may consist of a single substantially completely black segment, or in other words to a single substantially completely light blocking segment. With a black or substantially completely light blocking segment there is meant a segment having a transmittance that is substantially zero. The light blocking segment may be a light reflective segment or a light absorbing segment. FIG. 4 shows an exemplary color wheel 204 that has this modified structure, resulting in restriction of the illumination of the light modulating means 104 to a time period smaller than the image time frame. In other words, the illumination thus is blocked away from the light modulating means 104 during at least a time period of the image frame time. It will be clear for a person skilled in the art that, although a substantially completely light blocking segment covering half the color wheel is shown, the exact size of light blocking segment is not limiting for the present invention. Typically, the size of the light blocking segment may be such that the light is blocked at least 25% of the time. If the color wheel 204 in FIG. 4 is used at a constant speed, illumination of the light modulating means 104 is restricted to half the image frame time. The corresponding illumination intensity in function of time falling in on the light modulating means 104 is shown in FIG. 5. The purpose of restricting the illumination to the first interval is to display the image in a smaller timeframe so that the blurring which occurs when the image is moving is reduced. In this case, of course, there is a penalty to pay in the fact that there will be substantial light loss in the projector since the light from the lamp is obstructed during a substantial part of the frame time. The sequence of the light modulating means 104 needs to be adjusted so that it will only display the image information during the segments that are not black. If it is not possible to provide the complete bit depth on the light modulating means 104 in that reduced interval, the representation of the least significant bit or bits needs to be skipped.

Figure 6:
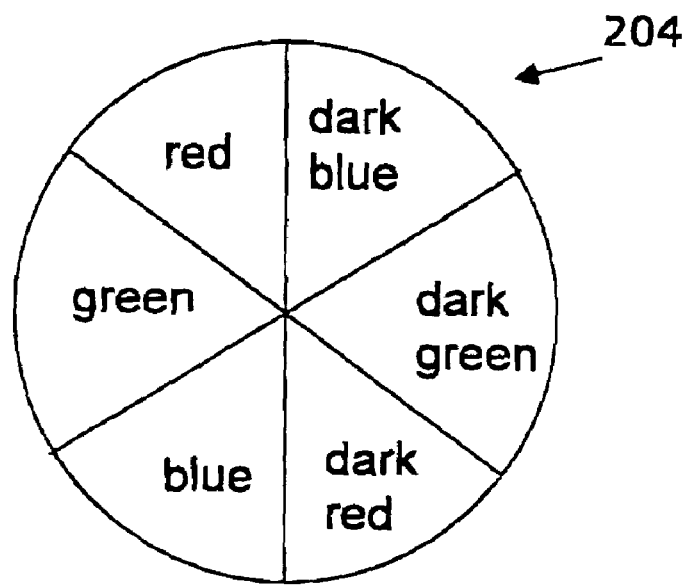
FIG. 6 is an exemplary illustration of a color wheel for use in a projection system according to a second alternative of the second embodiment of the present invention.
Figure 7:
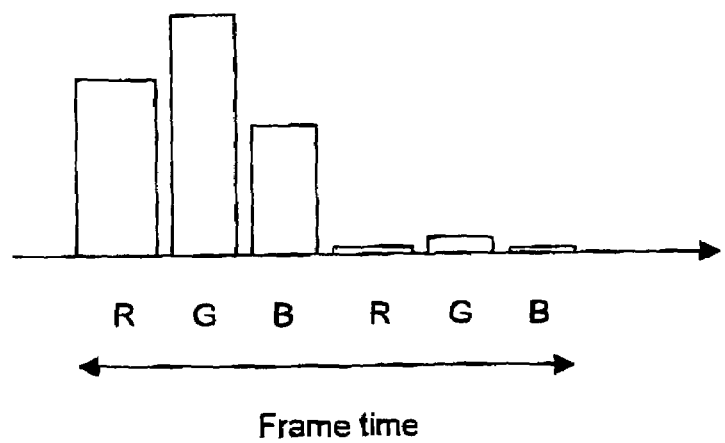
FIG. 7 is a graph indicating the illumination intensity during a frame for a projection system using a color wheel as shown in FIG. 6.

In a second alternative, the second set of color segments of the color wheel 204 may comprise a set of color segments for filtering similar colors as the first color segments, but whereby the color segments are substantially darker than the first set of color segments. In other words, the second set of color segments of the color wheel 204 may allow filtering the same colors, but provides corresponding illumination with a reduced intensity. The second set of color segments thus may provide color segments having a non-zero transmittance, but a transmittance that is substantially smaller or reduced, compared to the corresponding color segments in the first set of color segments. With corresponding color segments, color segments filtering substantially the same color are meant. If a redundant color wheel 204, i.e. if an optional white color segment is provided in the first set of color segments, the second set of color segments then may comprise also one or more dark grey segments. The purpose such a second set of color segments and optionally dark grey segment(s), is to reduce the total illumination flux on the light modulating means to the level and time required to illuminate the least significant bit or bits that were skipped in the first interval so that they still have the correct contribution to the required grey scale level. In other words, although the blurring effect and the image break-up effects can be significantly reduced, allowing some transmission of light through the second set of color segments allows to provide sufficient illumination to provide the required bit depth, i.e. grey levels. If the reduction factor of the illumination, i.e. the ratio of the illumination intensities during the illumination interval for the color segment in the first set of color segments and the illumination interval for the color segment in the second set of color segments, is called A than the formula for the preferred value of A can be found as $$A = \frac{L_{first}}{L_{second}} = \frac{t_{first}}{t_{second}} \cdot \left[\frac{2^N - 2^L}{2^L - 1}\right]$$

whereby N is the number of bits per color used on the light modulating device 104, L is the number of least significant bits attributed to the second set of color segments, $t_{first}$ is the total time interval in which all the most significant bits are displayed during the first interval, i.e. the illumination interval for the color segment in the first set of color segments, and $t_{second}$ is the total time interval in which all the least significant bits are displayed during the second interval, i.e. the illumination interval for the color segment in the second set of color segments. It thereby is to be noted that this reduction factor may be calculated for each color independently, e.g. for each primary color and for the optional white color. Small deviations to that formula are possible since they do not have a very large effect on the quality of the image. The purpose of this illumination organization is that the missing bits are represented and added to the image, so that the total bit depth of the images, hence the number of grey levels, are maintained for at least slow moving images or still images. But on a fast moving image the least significant bits are represented in the second time interval which is very dark compared to the first time interval, so that the extra light will not be noticeable for an observer who is tracking a fast moving object. FIG. 6 shows an example of a color wheel according to the present alternative of the present invention indicating by way of example a first set of color segments indicating three primary color segments, and a second set of color segments indicating darkened or less transmissive corresponding color segments. FIG. 7 shows an example of the illumination on the light modulating means for the corresponding color wheel shown in FIG. 6, when rotating inside the optical path.

It is to be noted that the above provided alternatives are only provided by way of illustration and that other alternatives for providing a first set of color segments and a second set of color segments, the second set comprising at least one segment with a reduced transmittance, compared to the color segments of the first set of color segments, can be found. The second set of color segments may e.g. comprise either a black or substantially completely blocking part and color segments with a reduced, but non-zero, transmittance.

It will be clear for a person skilled in the art, that although the invention has been described with respect to a color wheel, alternative embodiments of color selection means e.g., films, strips, plates, conveyor belts, etc. comprising similar color segments can be used as well, without leaving the scope of the invention.

In a third embodiment, the present invention relates to a system for projecting images at high quality as described in the first embodiment, whereby the illumination system comprises separate light sources emitting light of different colors which are driven such that the major part of the illumination intensity needed for creating an image of an image frame is restricted to a part of the image frame time. This results in reduction of blurring in fast moving images and reduction of image break-up effects in a projection system based on light valves. The latter thus is obtained by adapting the system such that the total time needed for providing the major part of the illumination intensity needed for creating an image of an image frame is reduced. In the present embodiment, the different light sources of the illumination system are driven at at least two different levels during the image frame time, whereby at least one driving level corresponds with completely no emission or a substantially smaller emission intensity than the other level.

Figure 8:
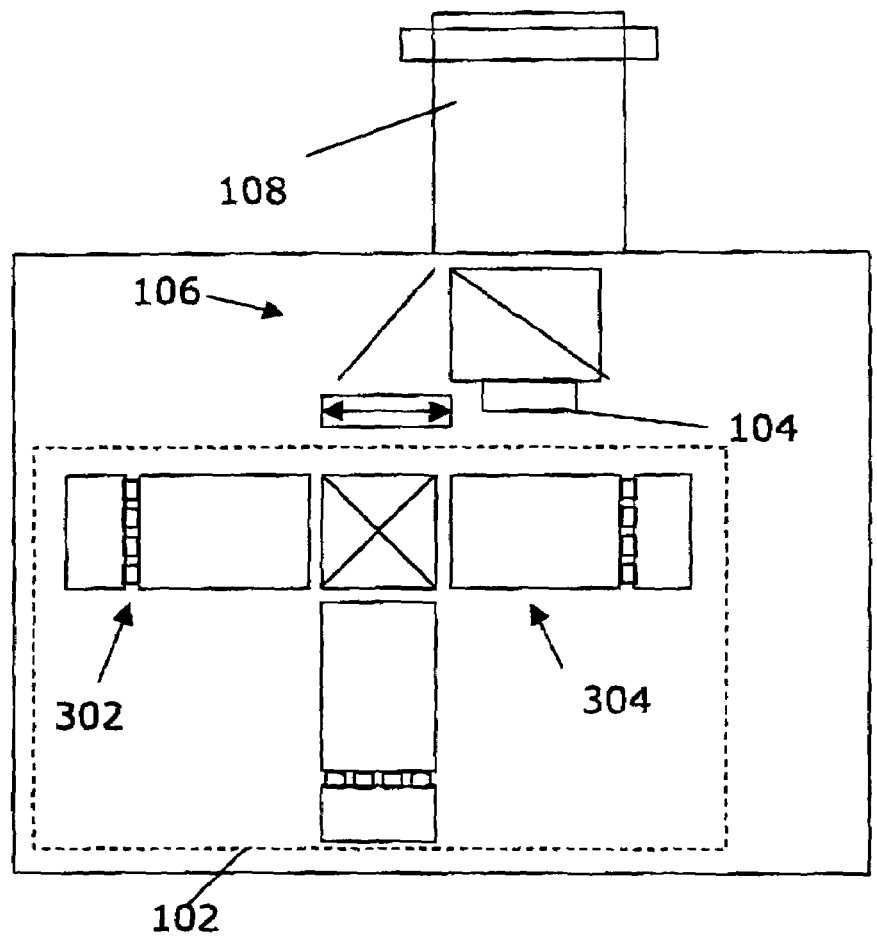
FIG. 8 is a diagrammatic illustration of a projection system adapted for reducing blurring effects in moving images according to a third embodiment of the present invention.

The system of the present embodiment, as shown in FIG. 8, is a projection system 300 comprising an illumination system 102 comprising a number of light sources 302, each light source 302 emitting light of substantially one color, whereby at least a number of light sources 302 emit light of substantially different colors. Typically, although the invention is not limited thereto, the illumination system 102 may be adapted to provide red, green and blue light. The light of the different light sources 302 is then sequentially combined to a single illumination beam that is provided to the light modulating means 104. The light sources 302 used in the illumination unit may be light emitting diodes (LEDs). The different light sources 302 may be equipped with a multilevel driving system (not shown) or controlling system, so that the intensity of the light sources 302 can be pulsed at least to a first and a second level, e.g. on and off, and optionally also set to an intermediate level. It is to be noted that the present embodiment of the invention is not limited to the exemplary setup shown in FIG. 8, but that it relates to all systems allowing timing of the illumination, with reference to the image information generated using the light modulating means 104, e.g. the frame time. The actual set-up of the projector thereby is of less importance.

In the present embodiment of the present invention, reduction of the total time needed to substantially create an image is obtained by reducing the driving time during which the light sources are driven at a relative high intensity. The light sources, e.g. LEDs, are driven so that the illumination, e.g. red, green, blue, and optionally white illumination, of the light modulating means is present during a first interval of the image frame time, which is smaller than 90% of the complete image frame time, more preferably smaller than 75% of the complete image frame time, even more preferably smaller than 67% of the complete image frame time. The image information thereby preferably may be displayed only one time per color, e.g. red, green blue and optionally white, during that first interval. It may not be possible to provide the complete bit depth in the reduced first time interval. The representation of the least significant bit or bits then needs to be skipped in this interval.

In a second time interval, which covers the remaining part of the image frame time, a substantially reduced illumination is provided. With substantially reduced illumination is meant that it is at least 10% smaller or at least 33% smaller or at least 50% smaller or at least 90% smaller or at least 99% smaller than the illumination intensity flux in the first time period or that no illumination occurs, i.e. the illumination flux is zero. If the first time interval is e.g. situated at the beginning of the frame time, the second time interval may e.g. be situated from the end of the first time interval until the end the frame time. A substantially reduced illumination may comprise a number of alternatives.

Figure 9:
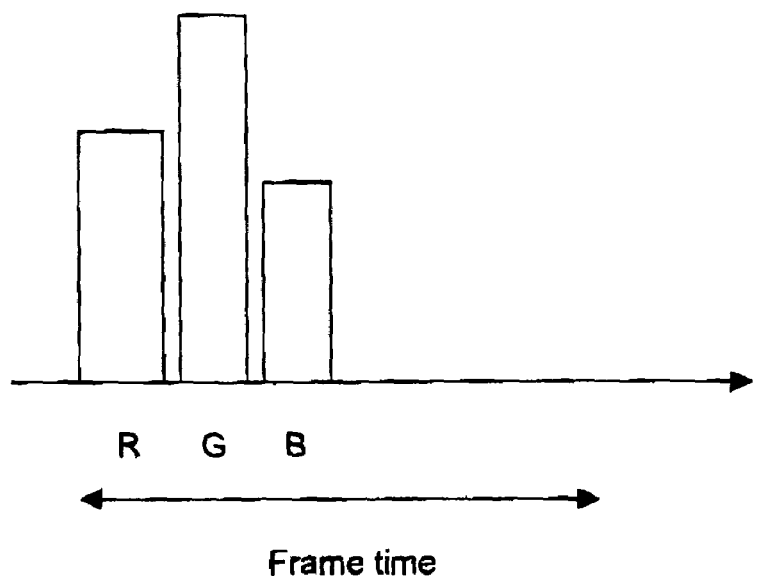
FIG. 9 is a graph indicating the illumination intensity during a frame for a projection system using a first alternative timing sequence for the illumination according to the third embodiment of the present invention.

In a first alternative, no illumination of the light modulating means is provided during the second time period of the image frame time. The illumination of the light sources of the illumination unit may then be turned off completely. FIG. 9 shows an example where all the illumination is restricted to a first time period which is in this example half the frame time. If the illumination is done via LEDs this has as a consequence that the illumination level can be higher during the first time period without an increase of the average power consumption of the LEDs. The advantage of restricting the illumination to the first time interval is that the complete image is displayed in a smaller timeframe so that the blurring which occurs when the image is moving is reduced.

Figure 10:
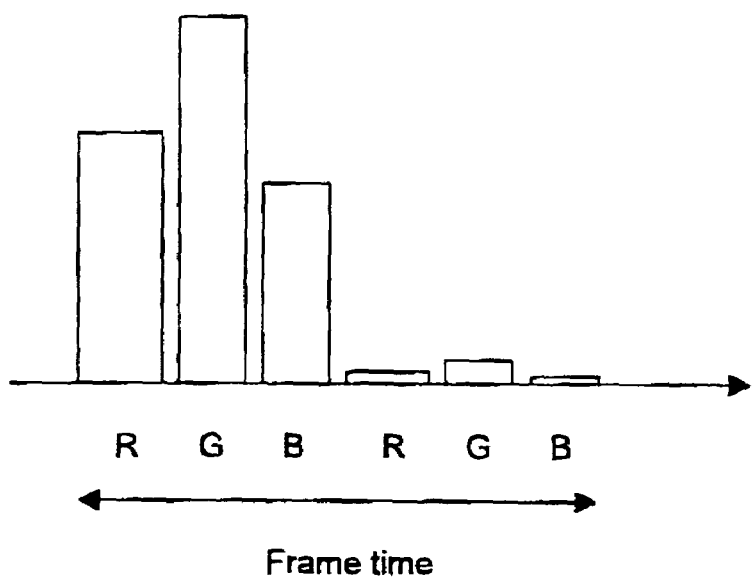
FIG. 10 is a graph indicating the illumination intensity during a frame for a projection system using a second alternative timing sequence for the illumination according to the third embodiment of the present invention.

In a second alternative, during the second time interval the illumination is reduced to a level which is A times lower than the illumination level of the first interval. Similar as in the previous embodiment, the reduction factor A of the illumination, i.e. the ratio of the illumination intensities during the first illumination interval and during the second illumination interval, preferably is given by $$A = \frac{L_{first}}{L_{second}} = \frac{t_{first}}{t_{second}} \cdot \left[\frac{2^N - 2^L}{2^L - 1}\right]$$

whereby N is the number of bits per color used on the light modulating device, L is the number of least significant bits attributed to the second time interval, $t_{first}$ is the length of the first time interval in which all the most significant bits are displayed and $t_{second}$ is the length of the second time interval in which all the least significant bits are displayed. Also here small deviations to that formula are possible since they do not have a very large effect on the quality of the image. The purpose of this illumination organization is equal to the case of the first embodiment described above. The advantage of lowering the total illumination flux in the second period to 0 or a low level compared to the first period, is that with separate light sources illumination it is possible to drive the separate light sources with more current in the first interval than if the light sources would have been used with equal illumination in the first and second time interval, so that some of the light output which is lost in the darker second time interval is recuperated. FIG. 10 shows an example of this illumination configuration where the first time interval is the first halve of the frame time and the second time interval is the second half of the frame time, whereby a reduced illumination is provided in the second time interval.

The organization of the illumination in the different colors inside the first and second interval can be done in different ways than represented on FIG. 9 and FIG. 10. The sequence of the colors can be changed, or the illumination intervals of the colors can be split up themselves in different sub-intervals, however the general rule remains that the subintervals stay within the first respectively second time interval.

It is an advantage of the embodiments of the present invention that it can be realized in a single chip LCOS projector. In this case it is preferable that the LCOS device has an update of all the color subframes of the image which is happening synchronously on all pixels together rather than line by line updating, in order to avoid disruptions in the images due to a conflict between the controlling of the illumination and the updating of the pixels.

Other arrangements for accomplishing the objectives of the projection systems embodying the invention will be obvious for those skilled in the art. While the invention has been shown and described with reference to preferred embodiments, it will be understood by those skilled in the art that various changes or modifications in form and detail may be made without departing from the scope and spirit of this invention. For example, whereas in the embodiments provided systems are described, the invention also relates to corresponding methods for driving them accordingly. Furthermore, although systems have been described, the invention also relates to a controller for controlling the driving of the color selection means, e.g. color wheel, or the driving of the separate light sources accordingly.

What is claimed is the following:

1. A projection system for projecting images, the projection system comprising an illumination system and a light modulating means, said illumination system configured for providing illumination on said light modulating means and said images being refreshed after an image frame time $t_{frame}$, wherein each image frame comprises at least two image subframes and wherein each frame time $t_{frame}$ is subdivided into two time intervals, a first time interval and a second time interval, the first time interval preceding the second time interval, and wherein, for each image frame and when representing an image with a bit depth, during the first time interval the most significant bits are represented, and during the second time interval additional bit depth for said image is provided.

2. A projection system according to claim 1, wherein during said second time interval of said image frame time $t_{frame}$, not overlapping with said first time interval, a reduced illumination of said light modulating means is provided, compared to said illumination in said first time interval.

3. A projection system according to claim 2, said image being represented with a bit depth, wherein during said second time interval only a predetermined number of least significant bits are represented.

4. A projection system according to claim 2, wherein the illumination obtained in the second time interval is matched with the illumination obtained in the first time interval as to obtain an appropriate bit depth.

5. A projection system according to claim 1, wherein the illumination system comprises a light source adapted for emitting light having at least two different colors and a color selection means, said color selection means comprising a first set of color segments for filtering colors from said light emitted by said light source and a second set of color segments comprising at least one segment with a substantially reduced transmittance compared to said color segments of said first set of color segments or with a zero transmittance.

6. A projection system according to claim 5, wherein said at least one segment of said second set of color segments, is a number of color segments equal to a number of color segments of said first set of color segments and adapted to filter the same colors as the color segments of said first set of color segments.

7. A projection system according to claim 1, wherein the illumination system comprises a number of light sources each light source adapted for emitting a specific color, said illumination being obtained by controlling the driving of said number of light sources accordingly.

8. A projection system according to claim 7, wherein said controlling the driving of said number of light sources comprises providing a total drive current to said number of light sources in the first time interval that is higher than the total drive current to said number of light sources in the second time interval.

9. A method for projecting images, each image being refreshed after an image frame time $t_{frame}$, each image comprising at least two image subframes and each image frame time $t_{frame}$ being subdivided into two time intervals, the method comprising providing illumination of a light modulating means during a first time interval of said image frame time $t_{frame}$ providing substantially reduced illumination of said light modulation means during a second time interval of said image frame time $t_{frame}$, said second time interval of said image frame time $t_{frame}$, following in time said first time interval and not overlapping with said first time interval; and providing, for each image frame, additional bit depth for said image during said second time interval.

10. A method according to claim 9, wherein said providing illumination comprises sequentially providing differently colored portions of an illumination beam.

11. A method according to claim 9, wherein said providing substantially reduced illumination or no illumination comprises substantially reducing or blocking said illumination beam.

* * * * *